United States Patent
Kuo et al.

(10) Patent No.: US 7,317,718 B1
(45) Date of Patent: Jan. 8, 2008

(54) FLEXIBLE COUNTER UPDATE AND RETRIEVAL

(75) Inventors: Albert Weichung Kuo, Los Gatos, CA (US); Reuven Meyer Samuel, San Jose, CA (US); Debashis Basu, San Jose, CA (US); Arunachalam Vaidyanathan, Los Altos, CA (US); Spencer Greene, Palo Alto, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1062 days.

(21) Appl. No.: 10/310,778

(22) Filed: Dec. 6, 2002

(51) Int. Cl.
*H04Q 11/00* (2006.01)
(52) U.S. Cl. .................... 370/360; 709/214; 709/215
(58) Field of Classification Search ............... 370/363; 702/179, 186; 709/223, 215; 379/134, 112.01
See application file for complete search history.

(56) References Cited

U.S. PATENT DOCUMENTS

| 6,038,592 | A  | * | 3/2000  | Verplanken et al. | ......... | 709/215 |
| 6,192,326 | B1 | * | 2/2001  | Lehtinen | ..................... | 702/186 |
| 6,330,599 | B1 | * | 12/2001 | Harvey | ....................... | 709/223 |
| 6,460,010 | B1 | * | 10/2002 | Hanes et al. | ................. | 702/179 |
| 6,625,266 | B1 | * | 9/2003  | Saari et al. | ............ | 379/112.01 |
| 2004/0228462 | A1 | * | 11/2004 | Kivela et al. | ............... | 379/134 |

* cited by examiner

*Primary Examiner*—Chi Pham
*Assistant Examiner*—Albert T. Chou
(74) *Attorney, Agent, or Firm*—Harrity Snyder, LLP

(57) ABSTRACT

A network device includes one or more processing units and an external memory. Each of the one or more processing units includes a centralized counter configured to perform accounting for the respective processing unit. The external memory is associated with at least one of the one or more processing units and is configured to store a group of count values for the at least one processing unit.

23 Claims, 9 Drawing Sheets

FLEXIBLE COUNTER UPDATE AND RETRIEVAL

BACKGROUND OF THE INVENTION

1. Field of the Invention

The present invention relates generally to network devices, and more particularly, to systems and methods for performing accounting in a network device.

2. Description of Related Art

In a typical network device where enqueue, dequeue, packet drop, byte and event statistics are desired, different counters and counter logic are used throughout the device at different stages of a data pipeline. High programmable input/output (PIO) bandwidth is generally needed when it is desired to retrieve statistics at a fairly short periodic interval. The interval is commonly determined by the number and size of the counters.

Each counter logic block in the network device may have different count memory schemes and count-update logic. Also, each count retrieval typically takes at least one PIO-read request. To change characteristics on counts belonging to separate blocks, consistency and coordination between system designers is needed.

As the number of network sources and streams grow, it becomes expensive and at times difficult to handle counts in the distributed manner described above. Flexibility is limited when predetermined counter location, size, as well as roll-over/saturating characteristics are set for a counter. Moreover, reading blocks of counts can be very time-consuming in the above-described architecture since at least one PIO-read request is needed for each count.

Accordingly, it is desirable to improve the ability to perform accounting in a network device.

SUMMARY OF THE INVENTION

Systems and methods consistent with the principles of the invention address this and other needs by providing a centralized counter logic block, which can be easily tailored to meet the needs of the system.

One aspect consistent with principles of the invention is directed to a network device that includes one or more processing units and an external memory. Each of the one or more processing units includes a centralized counter configured to perform accounting for the respective processing unit. The external memory is associated with at least one of the one or more processing units and is configured to store a group of count values for the at least one processing unit.

A second aspect consistent with principles of the invention is directed to a method for performing accounting in a network device that includes a group of processing blocks. The method includes processing a data unit via one of the processing blocks; generating a request to update a count value based on the processing; transferring the request to centralized counter logic, where the centralized counter logic is configured to perform accounting for at least two of the processing blocks; retrieving, via the centralized counter logic, the count value from a memory, where the memory stores count values for the at least two processing blocks; incrementing, via the centralized counter logic, the count value; and storing the incremented count value in the memory.

A third aspect consistent with principles of the invention is directed to a method for retrieving counter values in a network device. The method includes receiving a request for a block of counter values from a remote device at a centralized counter in the network device, retrieving the block of counter values from a memory, placing the block of counter values in at least one packet, and transmitting the at least one packet to the remote device.

A fourth aspect consistent with principles of the invention is directed to a network device that includes a group of processing blocks, a memory, and a centralized counter. The memory is configured to store counter values for at least two of the processing blocks. The centralized counter is configured to update the counter values in the memory, retrieve single counter values from the memory, and retrieve blocks of counter values from the memory.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of the invention refers to the accompanying drawings. The same reference numbers in different drawings may identify the same or similar elements. Also, the following detailed description does not limit the invention. Instead, the scope of the invention is defined by the appended claims and equivalents.

Implementations consistent with the principles of the invention efficiently perform accounting in a network device by providing a centralized counter logic block that performs all accounting functions and provides the ability to retrieve single counts through one PIO-read request or blocks of counts through a packetization technique thereby saving valuable bandwidth that would otherwise be spent on multiple PIO-read requests.

System Configuration

Figure 1:
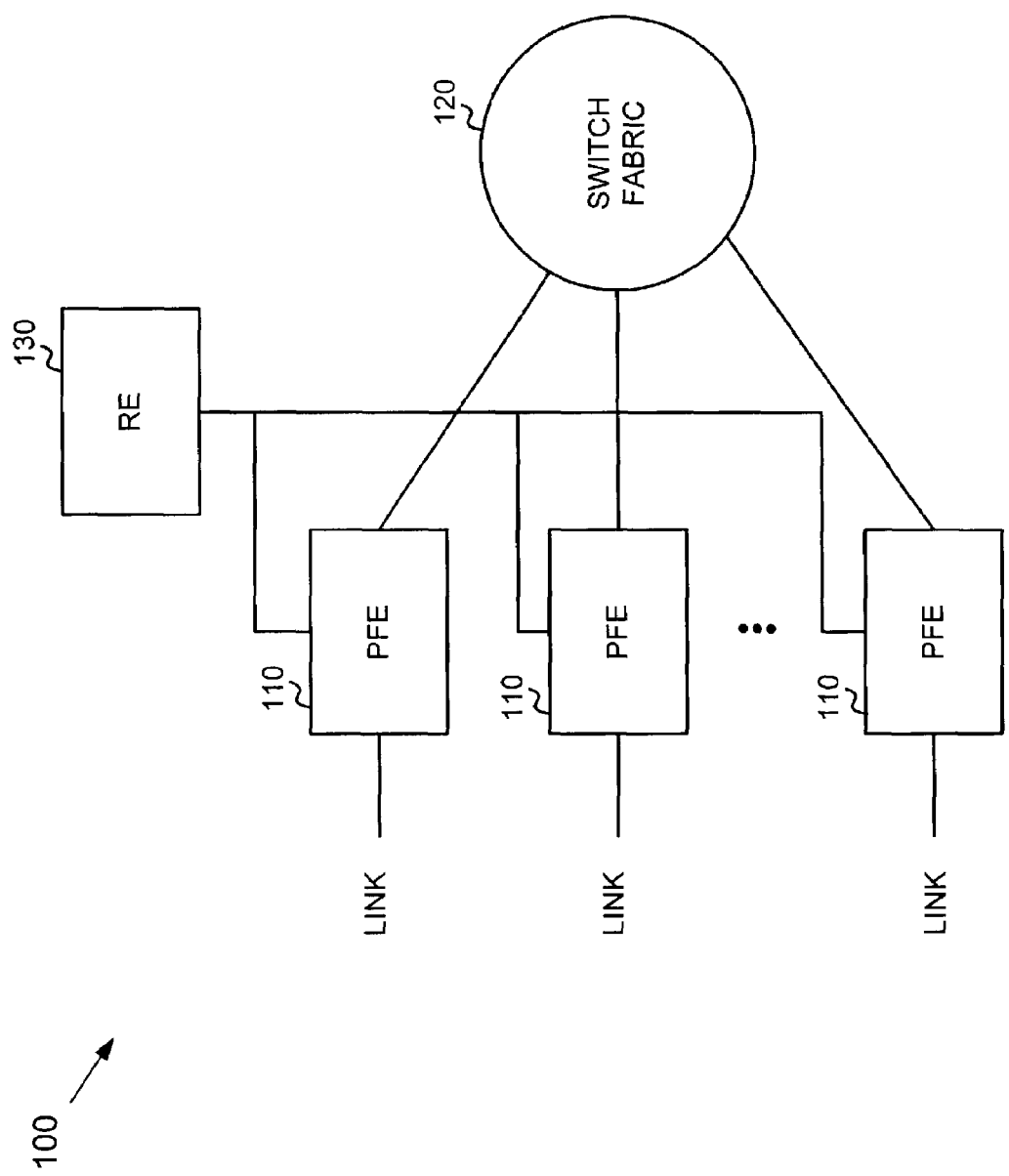
FIG. 1 is a block diagram illustrating an exemplary routing system in which systems and methods consistent with the principles of the invention may be implemented.

FIG. 1 is a block diagram illustrating an exemplary routing system 100 in which systems and methods consistent with the principles of the invention may be implemented.

System 100 receives one or more packet streams from physical links, processes the packet stream(s) to determine destination information, and transmits the packet stream(s) out on links in accordance with the destination information. System 100 may include packet forwarding engines (PFEs) 110, a switch fabric 120, and a routing engine (RE) 130.

RE 130 performs high level management functions for system 100. For example, RE 130 communicates with other networks and systems connected to system 100 to exchange information regarding network topology. RE 130 may create routing tables based on network topology information, create forwarding tables based on the routing tables, and forward the forwarding tables to PFEs 110. PFEs 110 use the forwarding tables to perform route lookup for incoming packets. RE 130 may also perform other general control and monitoring functions for system 100.

PFEs 110 are each connected to RE 130 and switch fabric 120. PFEs 110 receive packet data on physical links connected to a network, such as a wide area network (WAN), a local area network (LAN), or another type of network. Each physical link could be one of many types of transport media, such as optical fiber or Ethernet cable. The data on the physical link is formatted according to one of several protocols, such as the synchronous optical network (SONET) standard, an asynchronous transfer mode (ATM) technology, or Ethernet.

A PFE 110 may process incoming packet data prior to transmitting the data to another PFE or the network. PFE 110 may also perform a route lookup for the data using the forwarding table from RE 130 to determine destination information. If the destination indicates that the data should be sent out on a physical link connected to PFE 110, then PFE 110 prepares the data for transmission by, for example, adding any necessary headers, and transmits the data from the port associated with the physical link. If the destination indicates that the data should be sent to another PFE via switch fabric 120, then PFE 110 prepares the data for transmission to the other PFE, if necessary, and sends the data to the other PFE via switch fabric 120.

Figure 2:
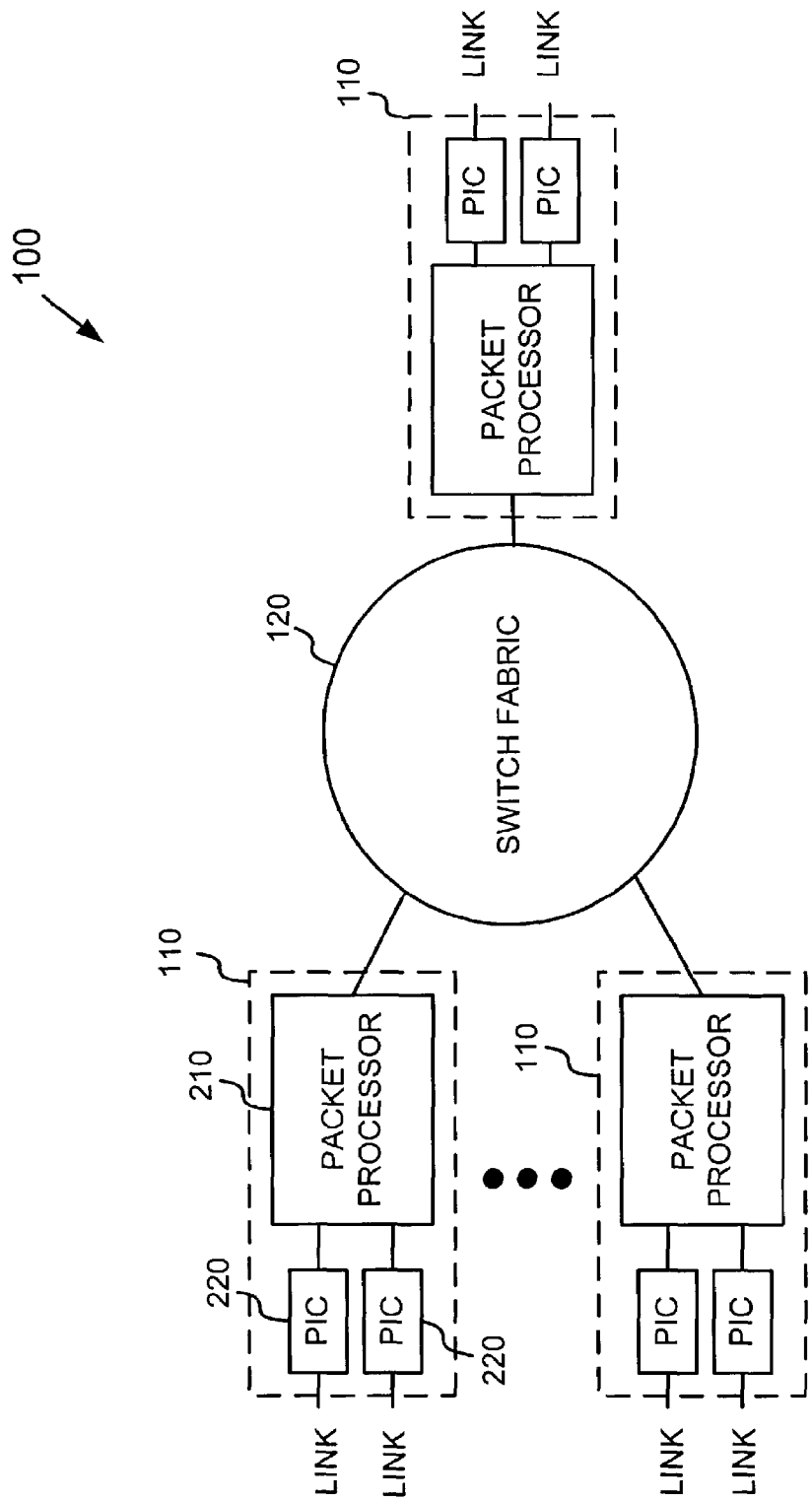
FIG. 2 is an exemplary detailed block diagram illustrating portions of the routing system of FIG. 1.

FIG. 2 is a detailed block diagram illustrating portions of routing system 100. PFEs 110 connect to one another through switch fabric 120. Each of PFEs 110 may include one or more packet processors 210 and physical interface cards (PICs) 220. Although FIG. 2 shows two PICs 220 connected to each of packet processors 210 and three packet processors 210 connected to switch fabric 120, in other embodiments consistent with principles of the invention there can be more or fewer PICs 220 and packet processors 210.

Each of packet processors 210 performs routing functions and handles packet transfers to and from PICs 220 and switch fabric 120. For each packet it handles, packet processor 210 performs the previously-discussed route lookup function and may perform other processing-related functions.

PIC 220 may transmit data between a physical link and packet processor 210. Different PICs may be designed to handle different types of physical links. For example, one of PICs 220 may be an interface for an optical link while another PIC 220 may be an interface for an Ethernet link.

In routing system 100 described above, it may be desirable to perform accounting at various stages of the system. The flexible counter update and retrieval technique described below can be implemented in any part (e.g., packet processor 210, PIC 220, etc.) of routing system 100 in which accounting services are desired. For explanatory purposes, it will be assumed that the flexible counter update and retrieval technique is implemented in a PIC 220.

Figure 3:
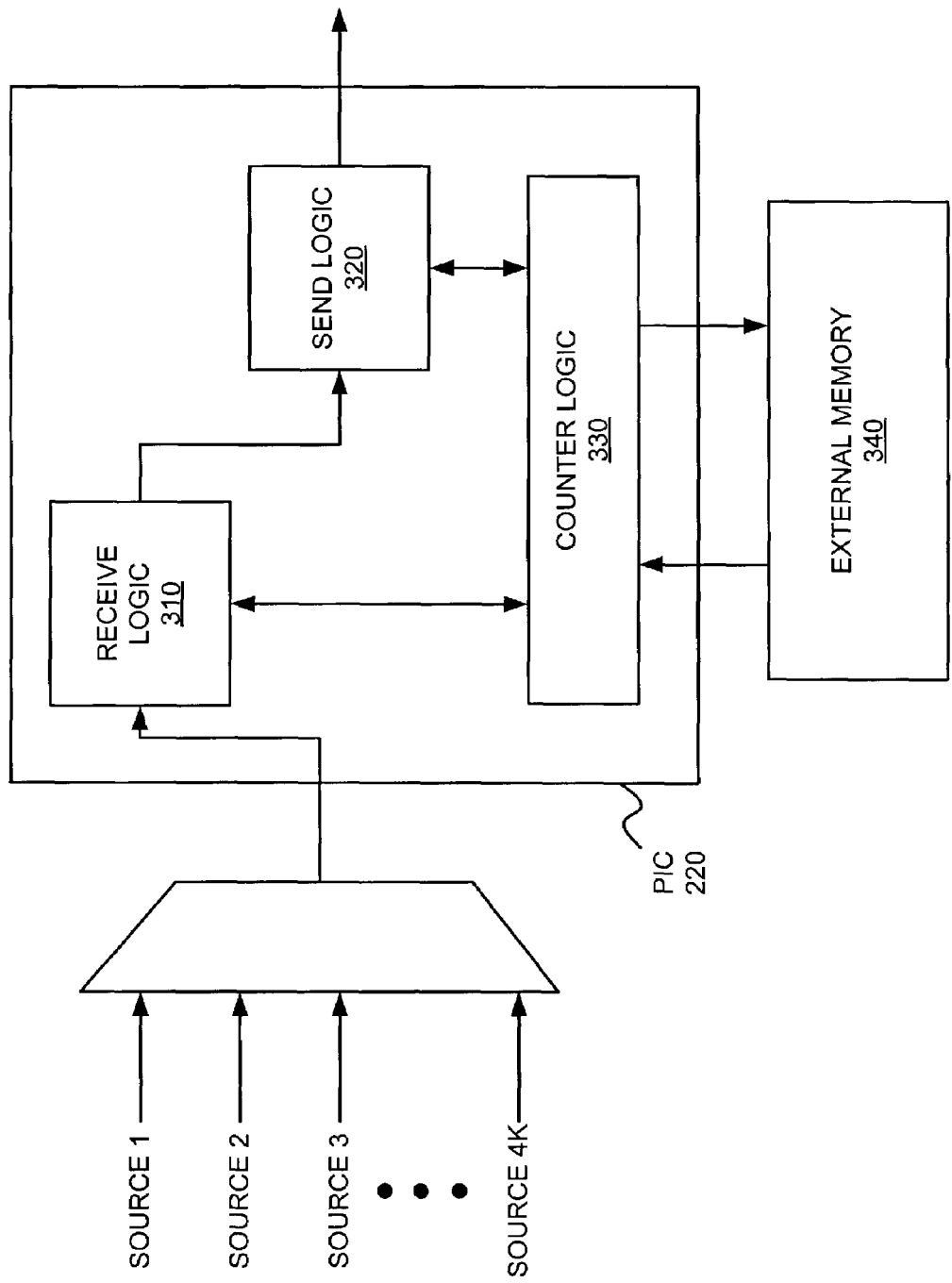
FIG. 3 illustrates an exemplary physical interface card (PIC) configuration according to an implementation consistent with the principles of the invention.

FIG. 3 illustrates an exemplary PIC 220 configuration according to an implementation consistent with the principles of the invention. As illustrated, PIC 220 includes receive logic 310, send logic 320, and counter logic 330 that, as will be described in detail below, updates and retrieves count values (referred to hereinafter as "counts") from an external memory 340. It will be appreciated that PIC 220 may include additional devices (not shown) that aid in receiving, processing, or transmitting data. Moreover, the number of components and sources illustrated in FIG. 3 is exemplary.

Receive logic 310 may receive a packet (or other data unit) from one of a group of sources (for illustrative purposes, labeled 1 to 4,000) and determine, based on the packet, what type of event is occurring. In an exemplary implementation, each source may be associated with 32 different events. Exemplary event information may include whether the packet is enqueued, dequeued, dropped, includes an error, etc. Other event information may include packet size (e.g., in bytes). This way, PIC 220 may track, for example, how many bytes have been enqueued, dequeued, dropped, etc. from a particular source. Upon receipt of a packet, receive logic 310 may transmit event information to counter logic 330 to allow for the appropriate count(s) to be updated in external memory 340.

Send logic 320 may receive a packet for sending out of PIC 220 and notify counter logic 330 accordingly. Counter logic 330 may then update the appropriate count(s) in external memory 340 based on the notification.

Counter logic 330 may receive event information from receive logic 310 and send logic 320 and update the appropriate count(s) in external memory 340 by performing a read/modify/write operation. Counter logic 330 may, for example, retrieve the appropriate count(s) from external memory 340, increment the count(s), for example, by adding one to the retrieved count(s), and write the new value(s) back to the same location(s) in external memory 340.

Counter logic 330 may also configure and allocate count space in external memory 340. Counter logic 330 allocates one count for each event associated with a source. In one implementation consistent with the principles of the invention, counter logic 330 may allocate counts in 1 byte, 2 byte, 4 byte, or 8 byte widths. All count widths are for packet counts, except, as will be described further below, that an 8-byte count may include a 29-bit packet-count field and a 35-bit byte-count field.

External memory 340 stores counts for the different events associated with each source in the system. In one implementation, external memory may include a double data rate static random access memory (DDrSRAM) that includes 128,000 memory lines, where each line includes 64 bits.

Figure 4:
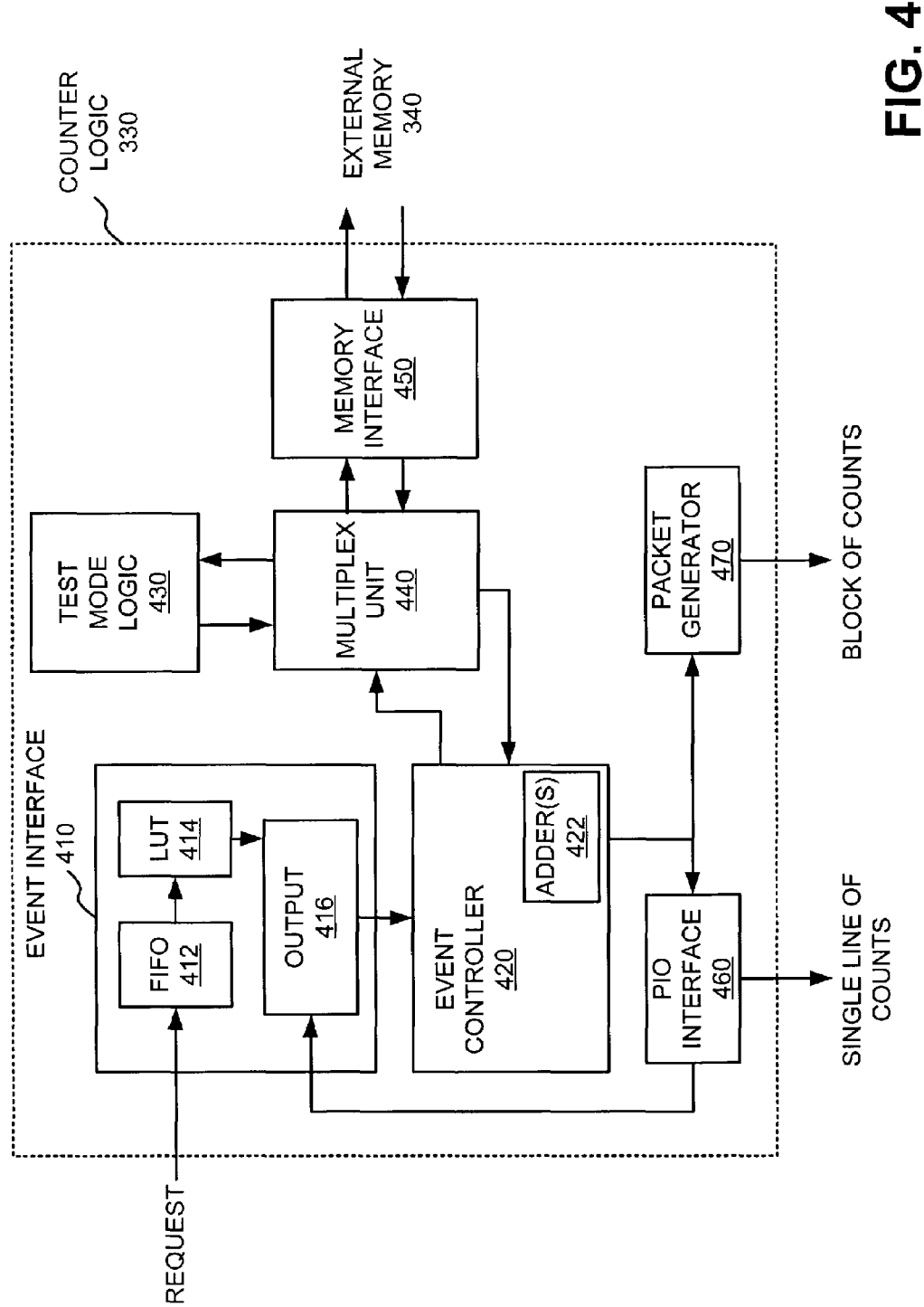
FIG. 4 illustrates an exemplary configuration of a counter block in an implementation consistent with the principles of the invention.

FIG. 4 illustrates an exemplary configuration of counter logic 330 in an implementation consistent with the principles of the invention. As illustrated, counter logic 330 may include an event interface 410, an event controller 420, test mode logic 430, a multiplex unit 440, a memory interface 450, a programmable input/output (PIO) interface 460, and a packet generator 470. It will be appreciated that counter logic 330 may include additional devices (not shown) that aid in receiving, processing, or transmitting data.

Event interface 410 may receive a count retrieval or update request and determine the location of the appropriate count in external memory 340. As will be described in additional detail below, a count retrieval request may retrieve a single 64-bit line from external memory 340 or a block of lines. An update request may include, for example, a source number that identifies the source (e.g., ranging from 0 to 4K−1), an event number that identifies the particular event (e.g., ranging from 0 to 31), and an increment amount in terms of packet length (e.g., from 0 to 65535). Counter logic 330 may use this information for updating a count in external memory 340.

Event interface 410 may include a first-in, first-out (FIFO) memory 412, a group of lookup tables (LUTs) 414, and an output interface 416. FIFO 412 may receive a request and temporarily store the request. FIFO 412 outputs requests in a first-in, first-out order. LUT 414 provides the location of a count in external memory 340 and the characteristics of the count.

Figure 5:
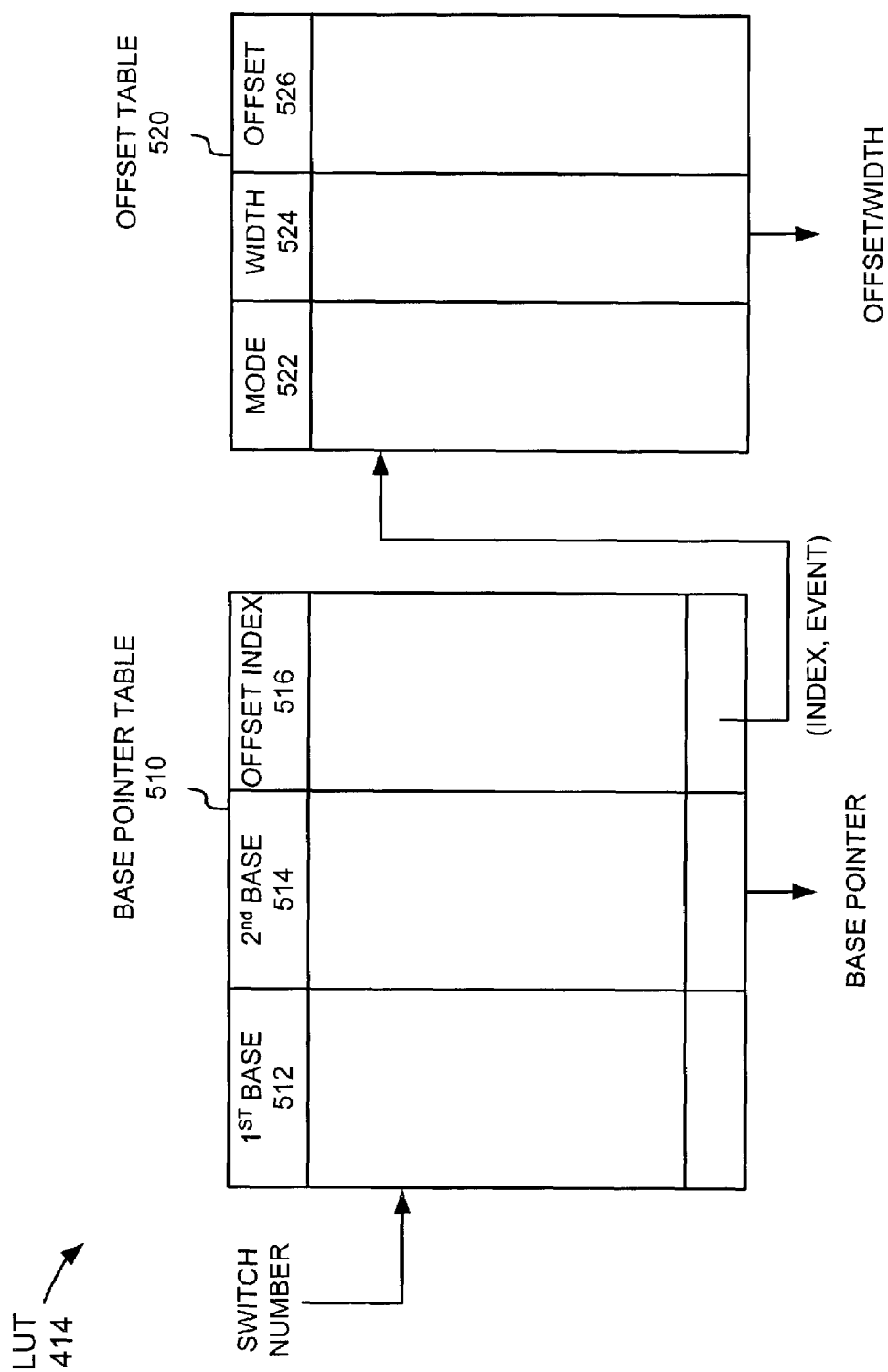
FIG. 5 illustrates an exemplary configuration of a lookup table (LUT) in an implementation consistent with the principles of the invention.

FIG. 5 illustrates an exemplary configuration of LUT 414 in an implementation consistent with the principles of the invention. As illustrated, LUT 414 may include a base pointer table 510 and an offset table 520. Base pointer table 510 may receive a request, including a source number and event number, and provide, based on the request, a base pointer that points to the start of a block of counts in external memory 340. Base pointer table 510 may include a first base pointer field 512, a second base pointer field 514, and an offset index field 516. First base pointer field 512 may include one or more base pointers that point to the start of blocks in external memory 340. In one implementation, each base pointer points to a 64-byte block of memory.

Similarly, second base pointer field 514 may include one or more base pointers that point to the start of blocks in external memory 340. As will be described in additional detail below, external memory 340 may be partitioned into a roll-over region and a saturating region. First base pointer field 512 includes one or more base pointer that point to the start of blocks in the roll-over region, while second base pointer field 514 includes one or more base pointers that point to the start of blocks in the saturating region. Offset index field 516 may include indices to entries in offset table 520.

Offset table 520 may receive an offset index and event number from base pointer table 510 and provide, based thereon, an offset value that points to a location of a count in the block identified by the base pointer provided by base pointer table 510. That is, offset table 520 provides a location of a count within the block identified by base pointer table 510.

Offset table 520 may include a mode field 522, a width field 524, and an offset field 526. Mode field 522 may include information indicating whether or not a particular count is enabled, and whether a count is in the roll-over or saturating region (i.e., if $1^{st}$ Base 512 or $2^{nd}$ Base 514 is to be used). Width field 524 may include information identifying the width of a particular count. As set forth above, a count may have a width of 1 byte, 2 bytes, 4 bytes, or 8 bytes. A width of a count may be easily changed by reprogramming the appropriate entry in width field 524 associated with the count. Offset field 526 may include offset values that identify the location of counts within a block identified by base pointer table 510. Base pointer table 510 and offset table 520 may be fully programmable.

Returning to FIG. 4, output 416 may receive a base pointer and offset and width values from LUT 414 and transfer these values to event controller 420. Event controller 420 identifies the event associated with a received request, converts a base pointer/offset/width values from base pointer table 510 and offset table 520 into an external memory 340 pointer, retrieves the appropriate count value, updates the count value (if appropriate), and stores the updated count value back into external memory 340. Event controller 420 may also transfer count read requests to PIO interface 460 and packet generator 470 for transfer to the appropriate destination.

Event controller 420 may include a set of adders 422. In one implementation, event controller 420 may include two adders 422. One adder may be dedicated to incrementing packet counts, while the other counter may be dedicated to incrementing byte counts. Packet counts may be incremented by one. Byte counts may be incremented by packet length.

Test mode logic 430, when activated, may zero out (or set to some predetermined value) all counts in external memory 340. Multiplex unit 440 transfers signals from event controller 420 or test mode logic 430 to the external memory 340. When test mode is activated, test mode logic 430 controls the reading/writing of count values from/to external memory 340. When test mode is deactivated, event controller 420 controls the reading/writing of count values from/to external memory 340.

Memory interface 450 transfers data to and receives data from external memory 340. Memory interface 450 also transfers the data received from external memory 340 to its appropriate destination (e.g., event controller 420). PIO interface 460 handles all PIO requests and allows for a single line of counts to be read from external memory 340 and overwritten, if desired. Packet generator 470 is similar to PIO interface 460 except that it allows for bigger chunks of counts (i.e., bigger than a single line) to be retrieved from external memory 340 and transferred out of PIC 220 in a packet format.

Figure 6:
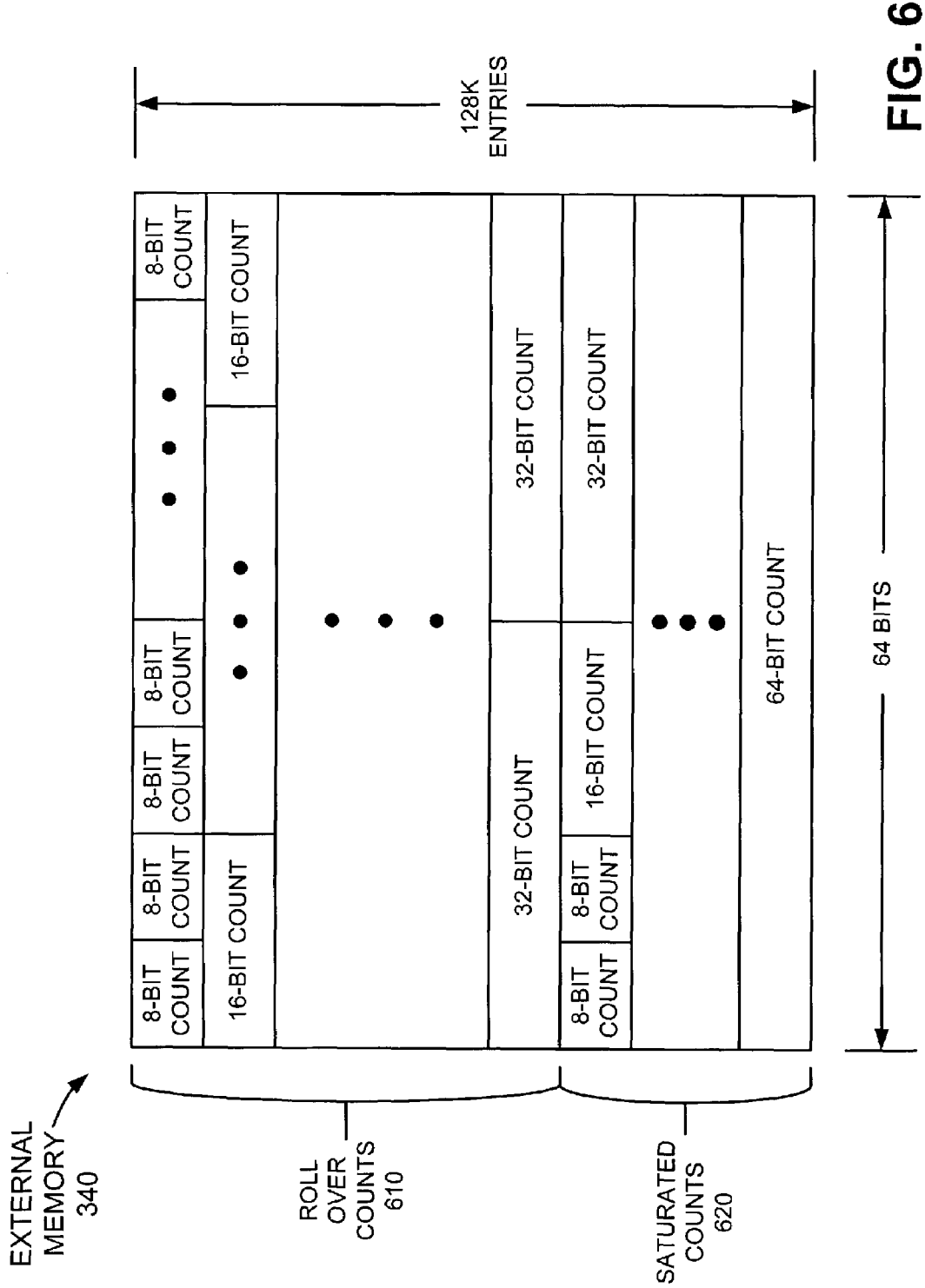
FIG. 6 illustrates an exemplary configuration of an external memory in an implementation consistent with the principles of the invention.

FIG. 6 illustrates an exemplary configuration of external memory 340 in an implementation consistent with the principles of the invention. In one implementation, external memory 340 may include 128,000 memory lines, where each line includes 64 bits.

As illustrated, external memory 340 may be partitioned into a roll-over region 610 and a saturating region 620. A count may be assigned to either roll-over region 610 or saturating region 620. The boundry between these two regions may be software programmable. In roll-over region 610, a count increments to some predetermined threshold, resets, increments to the threshold, and so on. In one implementation, the threshold is 16. In the saturating region, a count increments to some predetermined threshold and then stops, even if additional events for that count occur. Counts may be assigned to roll-over region 610 or saturating region 620 via LUT 414. As described above, counts may be assigned to 1-byte, 2-byte, 4-byte, or 8-byte widths.

Exemplary Processing

Figure 7:
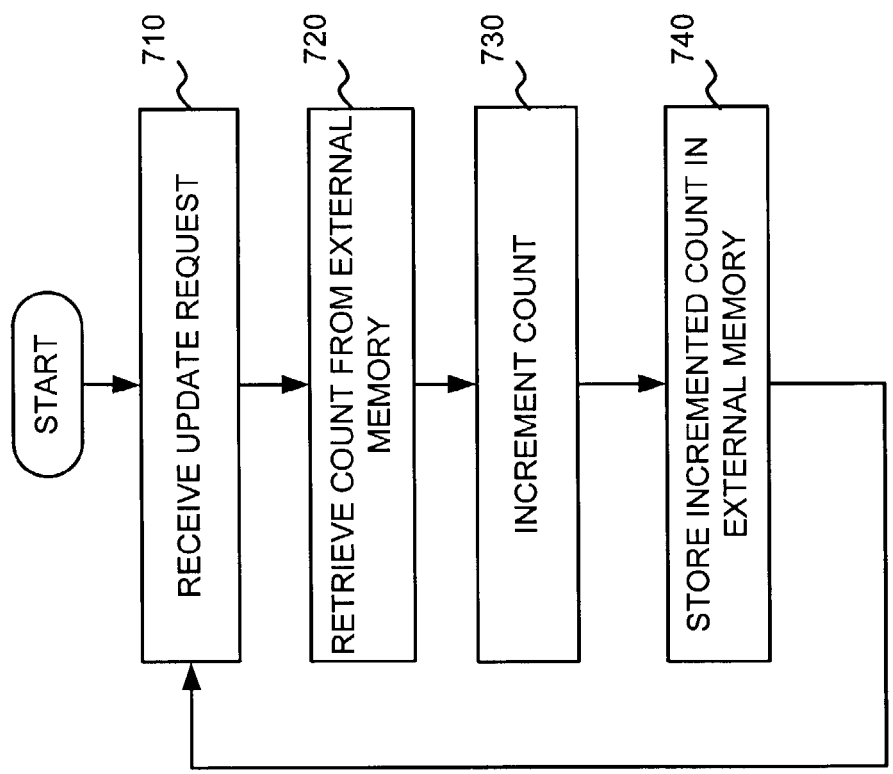
FIG. 7 illustrates an exemplary process for updating counts in an implementation consistent with the principles of the invention.

FIG. 7 illustrates an exemplary process for updating counts in an implementation consistent with the principles of the invention. Processing may begin with counter logic 330 receiving an update request [act 710]. Counter logic 330 may receive the update request from, for example, receive logic 310 or send logic 320 in response to the occurrence of an event (e.g., the dropping of a packet). The update request may include a source number that identifies the source of the packet, an event number that identifies the event, and an increment amount that identifies the amount that a count associated with the event is to be incremented. In one implementation consistent with the principles of the invention, the update request may be 33 bits, where the source number is 12 bits, the event number is 5 bits, and the increment amount is 16 bits. The increment amount may, in one implementation, represent the packet size (or length) in terms of bytes.

In response to the update request, counter logic 330 may retrieve the appropriate count from external memory 340 associated with the source number/event number identified in the request [act 720]. To retrieve the count, counter logic 330 may use base pointer table 510 and offset table 520 to obtain a base pointer and offset/width values that uniquely identify the location of the count in external memory 340. Counter logic 330 may retrieve the count based on the base pointer and offset/width values.

Counter logic 330 may then increment the count by the amount indicated by the increment amount in the update request [act 730]. In one implementation consistent with the principles of the invention, all counts in external memory 340 increment by one, except for those counts having an 8-byte width. As described above, 8-byte counts include a 29-bit packet-count field and a 35-bit byte-count field. Counter logic 330 may simultaneously update the packet-count field and byte-count field. The packet-count field may be incremented by one, while the byte-count field may be incremented by the packet size (in bytes).

Once the count has been incremented, counter logic 330 may store the incremented count in external memory 340 [act 740]. Processing may then return to act 710 with counter logic 330 processing the next update request.

When desired, the updating of counts may be enabled or disabled. As noted above, offset table 520 includes a mode field 522 that stores a value indicating whether updating for a particular count is enabled or disabled. In addition, counter logic 330 may be remotely controlled to start/stop the count update processing described above. Moreover, counter logic 330 may be remotely controlled to accept/drop update requests.

Figure 8:
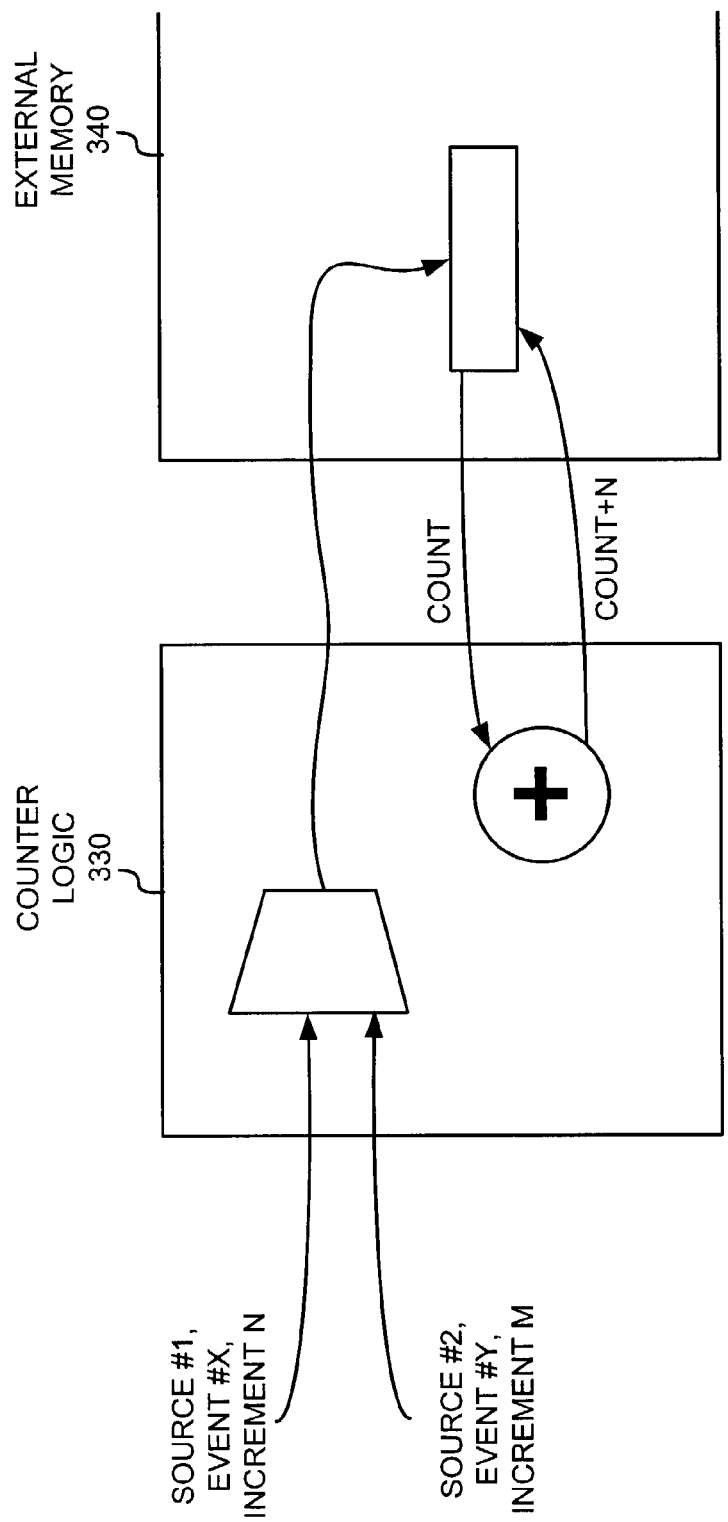
FIG. 8 illustrates a simplified block diagram of the processing described in relation to FIG. 7.

FIG. 8 illustrates a simplified block diagram of the processing described in relation to FIG. 7. As illustrated, counter logic 330 may receive update requests from, for example, receive logic 310 or send logic 320. In response, counter logic 330 may select one of the update requests to process based, for example, on which request was received first. Assume that counter logic 330 receives the update request {source #1, event #X, increment N} first. Counter logic 330 may retrieve the appropriate count from external memory 340, increment the count by the increment amount N, and store the new count (i.e., count+N) back to external memory 340. Counter logic 330 may then process the next update request.

Figure 9:
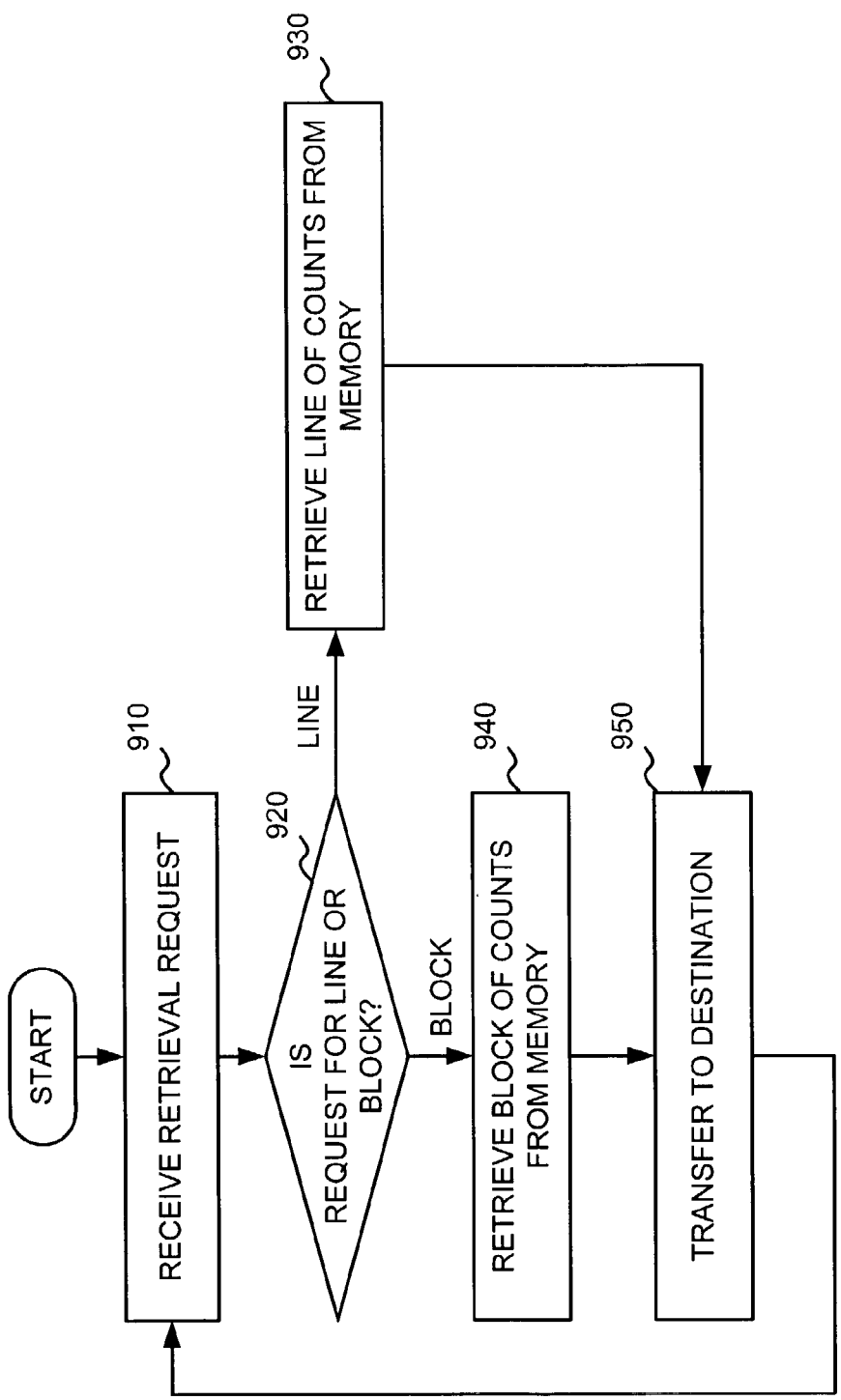
FIG. 9 illustrates an exemplary process for retrieving counts in an implementation consistent with the principles of the invention.

FIG. 9 illustrates an exemplary process for retrieving counts in an implementation consistent with the principles of the invention. Processing may begin with counter logic 330 receiving a count retrieval request [act 910]. In one implementation, the count retrieval request may include a PIO-read request for a single line (64 bits) of counts or a PIO-packetization request for a block (64 bytes) of counts from external memory 340.

If the request is for a single line of counts [act 920], counter logic 330 may retrieve the appropriate line from external memory 340 [act 930]. Once retrieved, the line in external memory 340 can be overwritten, if desired, with a user-defined value. Counter logic 330 may transfer the retrieved line from external memory to the appropriate destination via PIO interface 460 [act 950].

When high bandwidth is desired for count retrieval, a block retrieval request can be used. If counter logic 330 receives a block retrieval request [act 920], counter logic 330 may retrieve the appropriate block from external memory 340 [act 940]. Counter logic 330 may then packetize the retrieved block using packet generator 470 and transfer the packet to the appropriate destination [act 950]. In one implementation consistent with the principles of the invention, the packet may be interspersed with regular traffic and transmitted via, for example, send logic 320. Counts in saturating region 620 may be cleared (or reset) upon retrieval by counter logic 330, while counts in roll-over region 610 may remain intact upon retrieval.

In certain instances, it may be desirable to zero out (or reset) a group of counts in external memory 340. In one implementation consistent with the principles of the invention, this may be accomplished via test mode logic 430, via a single line retrieval request or a block retrieval request. When counter logic 330 enters a test mode, normal traffic to the block is temporarily stopped and test mode logic 430 assumes control of interfacing with memory interface 450. Test mode logic 430 may then walk through all the counts (or some portion of them) in external memory 340 and reset the values of the counts (e.g., set the values to zero). Alternatively, test mode logic 430 may set the counts to a user-specified value.

When a single line retrieval request is received, the requestor may be given the opportunity to overwrite the line of memory. If desired, the counts in the line in external memory 340 may be reset or set to a user-specified value. As described above, when retrieving a block of counts via a block retrieval request, any counts retrieved from saturating region 620 of external memory 340 may be automatically reset.

Implementations consistent with the principles of the invention improve the performance of accounting in a network device. Unlike conventional approaches, counter logic is aggregated and shared making it easier to configure counts, manipulate (e.g., start/stop) the count update process, and retrieve and overwrite counts. Flexibility is enhanced through the programmability of the characteristics for each counter. The counter logic need only include one set of adders since all counts are updated sequentially. While a single count can be retrieved through one PIO-read request, a one-shot packetization mechanism provides the ability to retrieve a block of counts via a single read request thereby saving valuable bandwidth over conventional techniques.

Scalability and design reusability is also enhanced through the use of centralized counter logic. By changing the memory and lookup table sizes, the event counts can be scaled without going through architectural changes.

CONCLUSION

Implementations consistent with the principles of the invention efficiently perform accounting in a network device by providing centralized counter logic that performs all accounting functions and provides the ability to retrieve single counts through one PIO-read request or blocks of counts through a packetization technique thereby saving valuable bandwidth that would be spent on multiple PIO-read requests.

The foregoing description of preferred embodiments of the present invention provides illustration and description, but is not intended to be exhaustive or to limit the invention to the precise form disclosed. Modifications and variations are possible in light of the above teachings or may be acquired from practice of the invention. For example, while series of acts have been described in FIGS. 7 and 9, the order of the acts may vary in other implementations consistent with the principles of the invention. Also, non-dependant acts may be performed in parallel.

Further, certain portions of the invention have been described as "logic" that performs one or more functions. This logic may include hardware, such as an application specific integrated circuit, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A network device comprising:
one or more processing units, each of the one or more processing units comprising a centralized counter configured to perform accounting for the respective processing unit, wherein the centralized counter includes:
a base pointer table configured to store a plurality of pointers to blocks of count values in the external memory, and
an offset table configured to store offset values that identify a location of a count value within one of the blocks; and
an external memory associated with at least one of the one or more processing units and configured to store a plurality of count values for the at least one processing unit.

2. The network device of claim 1 wherein, when performing accounting, the centralized counter is configured to:
update the plurality of count values in the external memory.

3. The network device of claim 2 wherein, when updating the plurality of count values, the centralized counter is configured to:
retrieve count values from the external memory,
increment the count values, and
store the incremented count values in the external memory.

4. The network device of claim 1 wherein the centralized counter is further configured to:
retrieve count values from the external memory, and
cause the retrieved count values to be transmitted to a remote device.

5. The network device of claim 4 wherein the external memory includes a plurality of lines, each of the lines including a plurality of count values, and
wherein, when retrieving the count values, the centralized counter is configured to:
retrieve one of the plurality of lines.

6. The network device of claim 5 wherein the centralized counter is further configured to:
retrieve a block of count values from the external memory, the block including a plurality of the lines.

7. The network device of claim 1 wherein the external memory is partitioned into a roll-over region and a saturating region, the roll-over region including count values that continually reset after reaching a first threshold and the saturating region including count values that stop incrementing after reaching a second threshold.

8. The network device of claim 1 wherein each of the plurality of count values may be configured to a width of 1 byte, 2 bytes, 4 bytes, or 8 bytes.

9. The network device of claim 1 wherein the offset table is further configured to store a width of each of the plurality of count values.

10. The network device of claim 9 wherein base pointer table and offset table are reconfigurable.

11. The network device of claim 1 wherein the centralized counter is configured to receive count update requests, each of the count update requests including a source number that identifies a source of a data unit received by a respective one of the processing units, an event number that identifies an event associated with the data unit, and an increment amount that identifies an amount a count value associated with the event is to be incremented.

12. The network device of claim 11 wherein the centralized counter includes:
a first adder configured to increment count values by one, and
a second adder configured to increment count values by the increment amount.

13. A method for performing accounting in a network device comprising a plurality of processing blocks, comprising:
processing a data unit via one of the plurality of processing blocks;
generating a request to update a count value based on the processing;
transferring the request to centralized counter logic, the centralized counter logic being configured to perform accounting for at least two of the plurality of processing blocks;
retrieving, via the centralized counter logic, the count value from a memory, the memory storing count values for the at least two processing blocks, wherein the retrieving includes:
performing a first lookup operation to retrieve a pointer to a block of counts in the memory,
performing a second lookup operation to retrieve an intra-block pointer, and
using the pointer and intra-block pointer to retrieve the count value from the memory;
incrementing, via the centralized counter logic, the count value; and
storing the incremented count value in the memory.

14. The method of claim 13 wherein the request includes a source number that identifies a source of the data unit, an event number that identifies an event associated with the data unit, and an increment amount.

15. The method of claim 14 wherein the request may include one of 4000 different source numbers, one of 32 different event numbers, and one of 65535 different increment amounts.

16. The method of claim 14 wherein the count value includes a data unit count value and a data unit size value and the increment amount includes a value representing a size of the data unit, and
wherein the incrementing includes:
incrementing the data unit count value by one, and
incrementing the data unit size value by the increment amount value.

17. The method of claim 13 wherein the performing a second lookup operation includes:
retrieving a count width value, and
wherein the using includes:
using the pointer, intra-block pointer, and width value to retrieve the count value from the memory.

18. A network device comprising:
a plurality of processing blocks;
a memory configured to store counter values for at least two of the plurality of processing blocks; and
a centralized counter configured to:
   update the counter values in the memory,
   retrieve single counter values from the memory, and
   retrieve blocks of counter values from the memory,
wherein the centralized counter includes:
   a base pointer table configured to store a plurality of pointers to blocks of counter values in the memory, and
   an offset table configured to store offset values that identify a location of a counter value within one of the blocks and a width of the counter value.

19. The network device of claim 18 wherein, when updating the counter values, the centralized counter is configured to:
retrieve the counter values from the memory,
increment the counter values, and
store the incremented counter values in the memory.

20. The network device of claim 18 wherein the centralized counter is further configured to:
receive, prior to updating the counter values, update requests, at least one of the requests including an increment amount.

21. The network device of claim 20 wherein the centralized counter includes:
a first adder configured to increment counter values in the memory by one, and
a second adder configured to increment counter values by the increment amount.

22. The network device of claim 18 wherein the centralized counter is further configured to:
packetize the retrieved blocks of counter values, and
cause the packetized blocks of counter values to be transmitted to a destination.

23. The network device of claim 18 wherein each of the blocks of counter values includes 64 bytes.

* * * * *